United States Patent [19]

Hallenbeck

[11] 4,016,467

[45] Apr. 5, 1977

[54] SERVODRIVE APPARATUS FOR DRIVING THE POSTAGE PRINTING DRUM IN A POSTAGE METER

[75] Inventor: Richard A. Hallenbeck, Wilton, Conn.

[73] Assignee: Pitney-Bowes, Inc., Stamford, Conn.

[22] Filed: Mar. 10, 1975

[21] Appl. No.: 556,711

[52] U.S. Cl. .............................. 318/604; 318/327; 101/235
[51] Int. Cl.² ..................... B41F 13/24; H02P 5/06
[58] Field of Search ............ 318/327, 326, 39, 604; 101/93, 235, 245

[56] References Cited

UNITED STATES PATENTS

| | | | |
|---|---|---|---|
| 3,383,578 | 5/1968 | Lewis | 318/326 X |
| 3,452,853 | 7/1969 | Mabon | 318/326 X |
| 3,537,393 | 11/1970 | Hegi | 101/235 |
| 3,614,757 | 10/1971 | Burr | 318/327 |
| 3,830,154 | 8/1974 | Hegi et al. | 101/245 X |
| 3,869,986 | 3/1975 | Hubbard | 101/91 |

*Primary Examiner*—B. Dobeck
*Attorney, Agent, or Firm*—William D. Soltow, Jr.; Albert W. Scribner; Robert S. Salzman

[57] ABSTRACT

A servodrive apparatus is disclosed for a postage meter having a postage printing drum mounted for rotation from and to a home position in single revolution increments and a conveyor for transporting individual pieces of mail into operative engagement with the incrementally rotating drum to be printed with postage. The servodrive apparatus drives the printing drum and controls the angular velocity of the drum to be substantially equal to a preselected angular velocity so that noise generated by the meter is decreased and its operating life is increased. This servodrive apparatus includes a motor for driving the printing drum and means for sensing the angular displacement of the printing drum. A signal generator produces a signal proportional to the preselected angular velocity and a comparator compares the sensed angular velocity of the drum and the preselected angular velocity. A motor control responds to the comparator to operate the motor so that it drives the printing drum substantially at the preselected velocity.

19 Claims, 11 Drawing Figures

SERVODRIVE APPARATUS FOR DRIVING THE POSTAGE PRINTING DRUM IN A POSTAGE METER

BACKGROUND OF THE INVENTION

1. Field of the Invention

The present invention relates to a servodrive apparatus for use in a postage meter.

Postage meters are used to store large total amounts of postage in a register and, on command, print portions of this total on individual pieces of mail in place of postage stamps. After each postage printing operation the total amount of postage stored in the register is depleted by the amount of postage dispensed.

Since postage dispensed by the meter is in effect currency which may be sold or exchanged, the meter must be carefully controlled to print accurately but to not print if the stored postage has been exhausted. Therefore, after each printing cycle is completed, the register is ordinarily sensed to determine whether or not sufficient postage remains in storage to print the next piece of mail. If there is sufficient postage, the meter is operable to print a desired amount. If not, the meter is "locked out" or rendered inoperative until again supplied with sufficient postage. For example, most postage meters are capable of printing up to $9.99 of postage. Accordingly, when a postage meter contains less than $10.00 of postage, the meter is locked out.

The servodrive apparatus of the present invention is intended for use in a postage meter of the type which employs a rotating drum, having a printing die which prints indicia representative of the specific amounts of postage on the individual pieces of mail. Each piece of mail is transported to the drum by a conveyor. The angular velocity of the drum is chosen so that the speed of the printing die is synchronized with the speed of the mail which passes by it to minimize distortion of the printed postage indicia. Further, passage of mail by the rotating drum is timed so that the postage is printed at the correct location on the mail.

Rotation of the printing drum in such postage meters is ordinarily stopped after each printing cycle to permit the postage storage register to be sensed as described above. That is, in each printing cycle, the printing drum is first accelerated from a home rest position to a constant velocity which is maintained for a predetermined period, during which the individual piece of mail is printed, and then is decelerated back to rest at the home position. Typical constant angular drum velocity in meters intended for high speed operation may be 350 rpm or more.

2. Description of the Prior Art

Rotating printing drum postage meters known in the prior art usually utilize a spring clutch arrangement to drive the drum from the same motor which drives the mail conveyor. Though inexpensive, such spring clutch arrangements accelerate the printing drum to and from constant angular velocity very abruptly. The angular velocity, as a function of time, of a typical postage meter drum driven through a spring clutch is indicated by dotted lines in FIG. 4. As can be seen, this velocity increases to the constant velocity portion of the printing drum cycle in a very short period of time, approximately 25 milliseconds. The angular velocity of the drum decreases from its high constant value in even shorter time, on the order of 10 milliseconds. Accordingly, acceleration and deceleration are very high. Therefore, postage meter operation is characterized by noisy chatter and meter operational life is substantially decreased.

These drawbacks of driving a meter printing drum through a spring clutch by the mail conveyor motor are aggravated when the meter is operated at high speed as described. Therefore, these prior art meters are not well suited for high volume, high speed applications.

Apparatus for controlling machines having incrementally rotating parts are also known. Such an apparatus is shown in FIG. 2 of PMI Application Note AN-4 entitled "Incremental Motion Servos" published by PMI Division of Kollmorgan Corporation. A similar apparatus is shown in FIG. 3 of an article entitled "Motors With Printed Circuit Armatures" by Hans Waagen, *Design Engineering*, January 1970. However, these apparatus are not adapted to control increasing and decreasing angular component velocity so that it substantially equals a preselected angular velocity.

SUMMARY OF THE INVENTON

In a preferred embodiment of the present invention to be described in detail below, the servodrive apparatus for a postage meter operates to drive the printing drum and controls the angular velocity of the drum, as a function of displacement, to be substantially equal to a preselected angular velocity. This preselected angular velocity is chosen to minimize both acceleration and deceleration within the constraints of the operating parameters of the postage meter.

A typical high speed postage meter which operates a letter speed of 55 inches per second completes one printing cycle in 500 milliseconds. However, it has been found that approximately 250 milliseconds are required by certain meters to perform functions other than printing postage on individual pieces of mail. Further, in such meters, the drum should be rotated at a constant high velocity for approximately 150 milliseconds to correctly impress the desired postage on each individual piece of mail. Accordingly, the drum may be accelerated to and decelerated from its constant high angular velocity in approximately 100 milliseconds, that is, accelerated from rest to the constant angular velocity in approximately 50 milliseconds and decelerated from the constant angular velocity back to rest in approximately 50 milliseconds.

The servodrive apparatus of the present invention controls angular drum velocity to be substantially equal to a preselected angular velocity so that the angular drum velocity increases from zero to the high constant velocity in as long a period as possible. In the typical postage meter described above, this is 50 milliseconds. Similarly, the angular drum velocity is controlled to decrease from the constant value to zero in as long a period as possible, again in the example given above, up to 50 milliseconds.

By carefully controlling increasing, constant, and decreasing angular velocity of the rotating printing drum in each of its single revolution cycles, a postage meter in which the servodrive mechanism of the present invention is installed operates quietly and without substantial vibration or noise. It has been found that noise and vibration produced by a meter using such a servodrive apparatus is less than that produced by the mail conveyor system, which ordinarily is considered quiet.

The preferred embodiment of the servodrive apparatus of the present invention includes a motor which drives the printing drum and is capable of rapid, controlled, acceleration and deceleration. Such a motor has an armature of low mass and, hence, low inertia, and is capable of developing high torque.

A motor control that includes three signal generating stages, produces a signal which is proportional to the preselected angular velocity. The first stage comprises a signal generator for producing a ramp signal proportional to the increasing velocity phase of this preselected velocity. The second stage comprises a signal generator for producing a run signal proportional to the constant velocity phase of the preselected velocity. And the third stage comprises a signal generator for producing a deceleration control signal proportional to the angular displacement of the drum from its home position after the constant velocity phase of the drum cycle has been completed.

A sensor is coupled to the drum to sense its angular displacement and to produce a velocity signal proportional to the drum angular velocity. Both this velocity signal and the ramp signal are fed to a comparator amplifier which produces a motor driving signal during the increasing velocity phase proportional to the difference between the ramp and velocity signals. Similarly, the run signal generator and a motor feedback circuit sensing the angular velocity of the drum are connected to a second comparator amplifier to produce a motor driving signal during the constant velocity phase of the preselected angular velocity. Finally, the deceleration control signal generator and a motor feedback circuit for sensing the angular velocity of the drum are connected to the second comparator amplifier to produce a motor driving signal during the decreasing velocity phase.

A motor speed control responds to the first and second comparator amplifier output signals to regulate the angular velocity of the motor and in turn regulate the angular velocity of the printing drum. In this fashion, the angular velocity of the printing drum is controlled to be substantially equal to the preselected angular velocity which, as noted, is chosen to minimize mechanical noise and vibration.

Switching circuits are also provided to selectively, sequentially, connect the ramp, run, and deceleration control signal generators to the motor control through the respective comparator amplifiers during the increasing, constant, and decreasing velocity phases of the drum rotation cycle.

It is a primary object of this invention to provide an improved postage meter printing apparatus;

It is another object of the invention to provide an improved driving mechanism for the print drum of postage meter, with which they have an increased operating life.

Accordingly, it is an object of the present invention to provide a novel servodrive apparatus for a postage meter having an incrementally rotating printing drum. This servodrive apparatus drives the printing drum and controls the angular velocity of the printing drum to operate the postage meter in a quiet, smooth manner.

Other objects, aspects, and advantages of the present invention will be pointed out in or will be understood from the detailed description provided below in conjunction with the accompanying drawings.

DESCRIPTION OF THE PREFERRED EMBODIMENT

Figure 1:
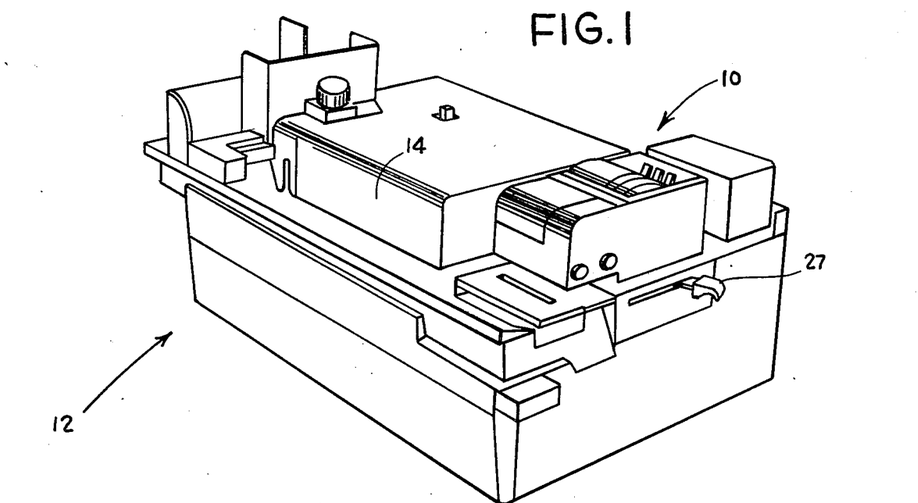
FIG. 1 is a perspective view of a postage meter and peripheral machinery associated with it in which the servodrive apparatus of the present inventon may be installed.
Figure 2:
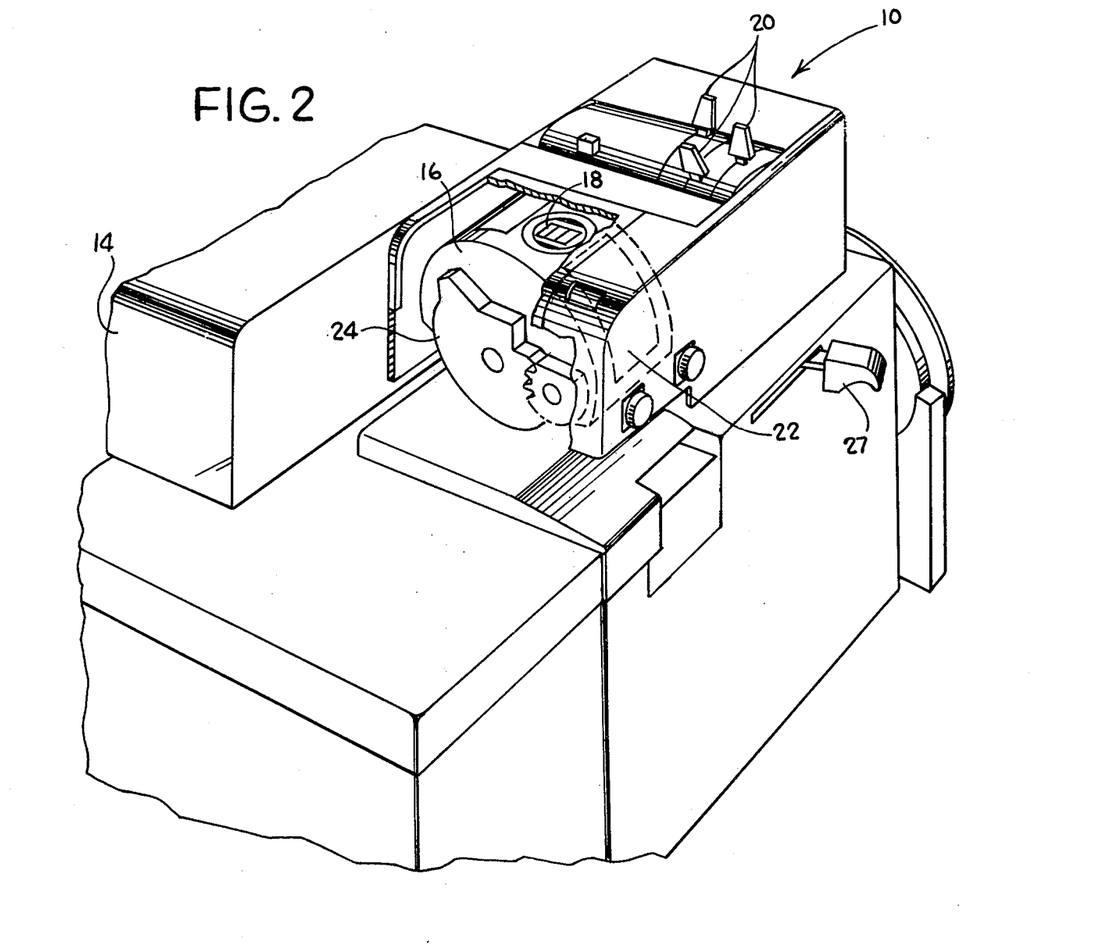
FIG. 2 is an enlarged perspective view of this postage meter illustrating the printing drum in detail.

FIGS. 1 and 2 illustrate a typical postage meter, generally indicated at 10 and other peripheral mail handling machinery indicated at 12 which may advantageously include the servodrive apparatus of the present invention. The peripheral equipment 12 includes a letter conveyor 14, which transports individual pieces of mail into operative engagement with the postage printing meter 10, and may include apparatus for performing other functions such as, for example, sealing envelopes as they are transported to the meter 10.

The postage meter 10 includes a postage printing drum 16 which carries a printing die 18 on its side cylindrical wall. A series of register levers 20 are provided to set the desired amount of postage to be printed. The printing drum 16 may also have a printing die 22, that is moved to and from a printing position by a manually operated lever and gear assembly 24, for printing mail with an advertisement or other information.

Figure 3:
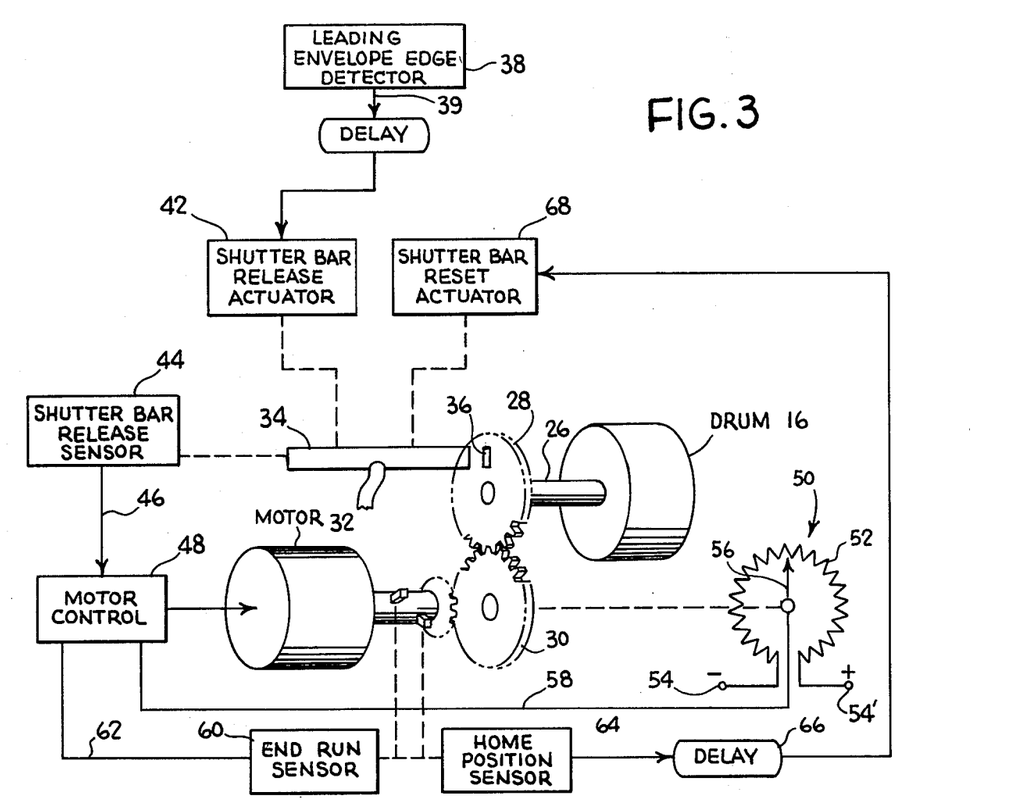
FIG. 3 is a functional diagrammatic representation of the servodrive apparatus of the present invention.

As shown diagrammatically in FIG. 3, the postage printing drum 16 is mounted for rotation on a shaft 26 to print postage on individual pieces of mail transported by it. Shaft 26 carries a driven gear 28 which meshes with a drive gear 30 coupled, in a manner set forth in detail below, to a motor 32. Drum rotation is incremental, that is, the drum is stopped and at least momentarily locked after each postage printing cycle by a reciprocally mounted shutter bar 34 which is adapted to be projected into a lock hold 36 formed in driven gear 28. If insufficient stored postage remains to print postage on a subsequent piece of mail the shutter bar remains in the locked position. Furthermore, in each single revolution printing cycle the drum reaches a high constant angular velocity, accelerating and decelerating from rest, prior to the printing portion of the cycle.

It is the purpose of the servodrive apparatus of the present invention to control the angular velocity of the postage printing drum 16 to be substantially equal to a preselected angular velocity. As noted above, this preselected velocity is chosen so that the angular drum velocity increases to and decreases from its high constant value in periods as long as possible. For example, if operating constraints are those of the typical meter described above, 50 milliseconds may be utilized in accelerating the drum to the high constant velocity and 50 milliseconds may be utilized in decelerating the drum from the high constant angular velocity. Such a desired preselected angular velocity is illustrated by the solid line in FIG. 4. By controlling the angular velocity of the postage printing drum to be substantially equal to this preselected angular velocity, the servodrive apparatus of the present invention reduces mechanical noise and vibration. Accordingly, a postage meter in which this apparatus is installed is not as annoying or difficult for its operator to use. Perhaps more importantly, the postage meter's operational life is increased since destructive vibration created by abrupt starting and stopping of the printing drum is reduced.

To accomplish its purpose, this servodrive apparatus and the components for initiating its operation include leading envelope edge detector 38 mounted to detect when an individual piece of mail passes a predetermined point in the mail conveyor (FIG. 3). The detector 38 produces an output signal 39 in the form of a pulse which is applied through a delay 40 to actuate a shutter bar release actuator 42 and reciprocate shutter bar 34 from engagement with lock hole 36. The delay 40 is necessary because of constraints on the location of the detector 38. When the shutter bar is released, a shutter bar release sensor 44 initiates a motor start signal 46 that is conducted to a motor control 48 to start the motor 32. This motor control includes three stages, to be described in greater detail below. A first generates a signal proportional to the increasing velocity phase of the preselected angular velocity; a second generates a signal proportional to the constant velocity phase of the preselected angular velocity; and a third stage generates a deceleration signal proportional to the angular displacement of the drum from its home position after the constant velocity phase has been completed.

The angular displacement and hence, velocity of the drum is monitored by a displacement sensor in the form of a potentiometer 50 having a fixed resistance 52 connected across a source of voltage 54, and a slider 56 mounted for rotation with drive gear 30. Potentiometer 50 generates a feedback signal 58 which is conducted to the motor control 48 and is compared with the signals generated thereby proportional to the preselected velocity to regulate the angular velocity of the motor to, in turn, drive the drum substantially at the preselected angular velocity.

The motor is also connected to an end run sensor 60 which is set to detect when the constant angular velocity phase of printing drum rotation has been completed. An end run signal 62 generated by sensor 60 is fed back to the motor control 48 to initiate the deceleration phase of operation.

Finally, the motor is connected to a home position sensor 64 which activates a delay 66. The delay 66, after a predetermined period that permits the drum and other meter components to come to rest, actuates a shutter bar reset actuator 68 which reciprocates the shutter bar into the driven gear lock hole 36. This locking completes the printing cycle after which the postage register of the meter is sensed.

Figure 5:
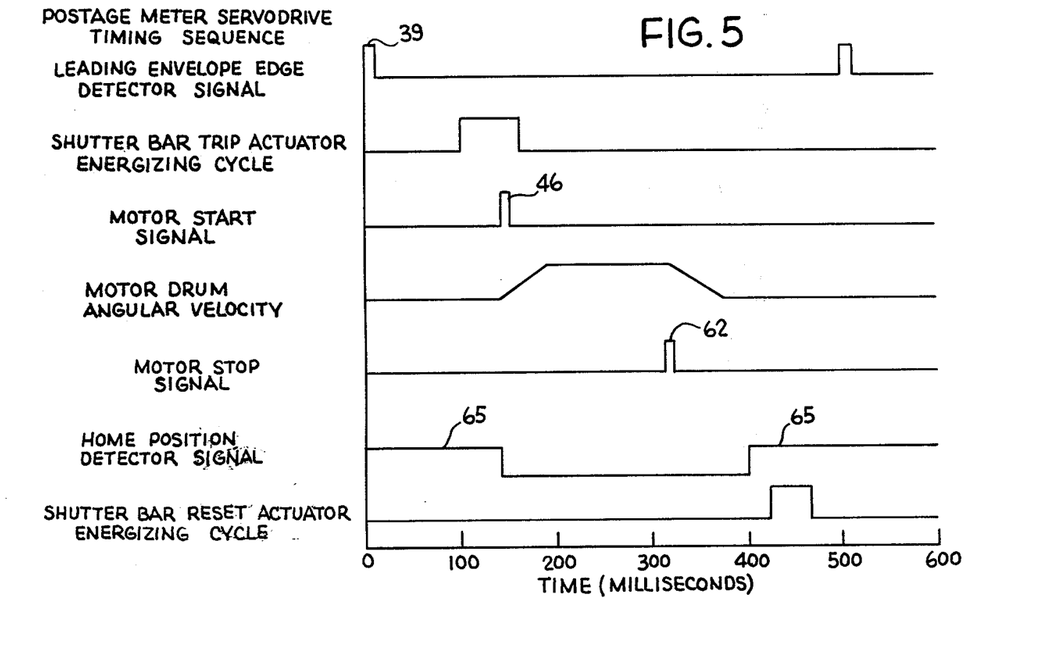
FIG. 5 is a graphic representation of the timing sequence of the various functions of the servodrive apparatus of the present invention.

FIG. 5 illustrates the timing sequence of the preferred embodiment of the servodrive apparatus and postage meter in which it is installed. At time zero an individual piece of mail passes the envelope leading edge detector 38 which generates output signal 39 in the form of a pulse. After approximately 130 milliseconds, a delay introduced by the first delay 40, the shutter bar is released by actuator 42. To insure proper operation, actuator 42 is energized for approximately 50 milliseconds. Approximately 35 milliseconds after the actuator has been energized, shutter bar 34 moves sufficiently to actuate shutter bar release sensor 44 which generates a motor start signal 46 of approximately 5 milliseconds in duration. At this time, the motor and meter drum angular velocity begin to increase through the increasing phase of the preselected angular velocity. Simultaneously, the home position sensor 64 stops generating a signal indicating that the drum is at the home position. The increasing velocity phase of the preselected velocity is completed after approximately 50 milliseconds and the constant velocity phase which follows is completed after approximately 150 milliseconds. When the constant velocity phase is completed, the end run sensor 60 generates a stop signal 62 of approximately 3 milliseconds. This initiates the decreasing velocity phase of the angular drum velocity function to drive the drum to home position. When the home position is reached, the home position sensor 64 again generates a signal 65. After approximately 50 milliseconds, a delay introduced by the delay 66, the shutter bar reset actuator 68 is energized for approximately 50 milliseconds. The entire printing drum cycle requires approximately 250 milliseconds, which permits operation at a letter feed rate of 55 inches per second.

FIGS. 6 through 11 illustrate the preferred embodiment of the serodrive apparatus and postage meter in which it is installed in greater detail. The postage meter 10 is fixed to the peripheral equipment 12 by a latch 25 that is operated by a lever 27. By moving this lever 27 forward, the meter may be removed from the peripheral machinery and taken to a post office where postage is purchased and registered in it. As noted above, the meter 10 comprises a driven gear 28 which is coupled for rotation to the drive shaft 26. The shutter bar 34 is mounted for reciprocal movement, as shown by arrow A, in the bottom of meter 10 and has a locking tab 70 adapted to engage the small slot or lock hole 36 formed in the driven gear 28.

The mechanical portion of the servodrive apparatus of the present invention (FIGS. 6 through 10) is mounted in a frame which includes two upstanding end walls 72 and 73, a top platform 74 on which the postage meter 10 is mounted, a bottom support platform 76 and a mounting table 78. Motor 32 is mounted on an upstanding support plate 80 which is attached to the bottom support platform 76. This motor 32 is advantageously capable of controlled high acceleration and deceleration yet is capable of developing high torque. (It has been found that a motor manufactured under the trade name "PANCAKE" by the PMI Division of the Kollmorgen Corporation is suitable for this application). Such motors may have printed circuit armatures of low mass and hence they have low inertia.

The motor shaft 82 (FIG. 7) is journaled in the rear end plate 72 and carries a drive pinion 84 for rotation with it. A main drive shaft 86 is journaled between end walls 72 and 73 and carries the main drive gear 30 which meshes with the drive pinion 84. The main drive gear 30 in turn meshes with the postage meter driven gear 28. The gear ratio between the main drive and driven gears 30 and 28 is one to one. Accordingly, the drive shaft 86 rotates at the same angular velocity as does the printing drum 16. In addition, since the drum is positively driven by the gear train, angular drum velocity can be controlled by regulating angular motor velocity.

Further, for printed circuit motors such as the "PANCAKE" motor, maximum power transmission is obtained when a gear ratio of drive to driven gears is chosen as the square root of the ratio of the inertia of the motor to the inertia of the load. In a typical postage meter in which such a servodrive apparatus may be installed, the printing drum inertia is 25 times greater than the motor inertia. Accordingly, the gear ratio of the main drive gear 30 to the drive pinion 84 is chosen to be approximately five to one.

Figure 6:
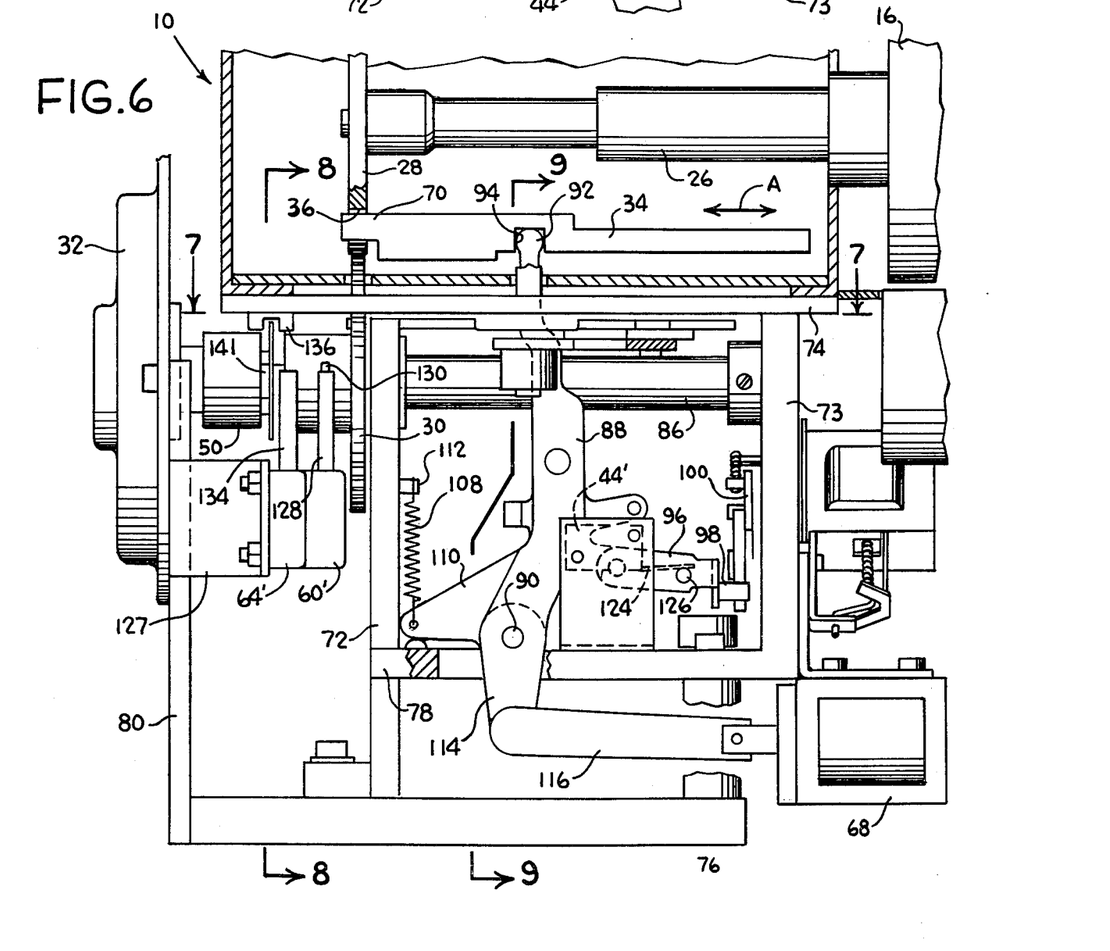
FIG. 6 is a partial cross-sectional side view of the postage meter shown in FIG. 2 installed on the mechanical portion of the servodrive apparatus of the present invention.
Figure 7:
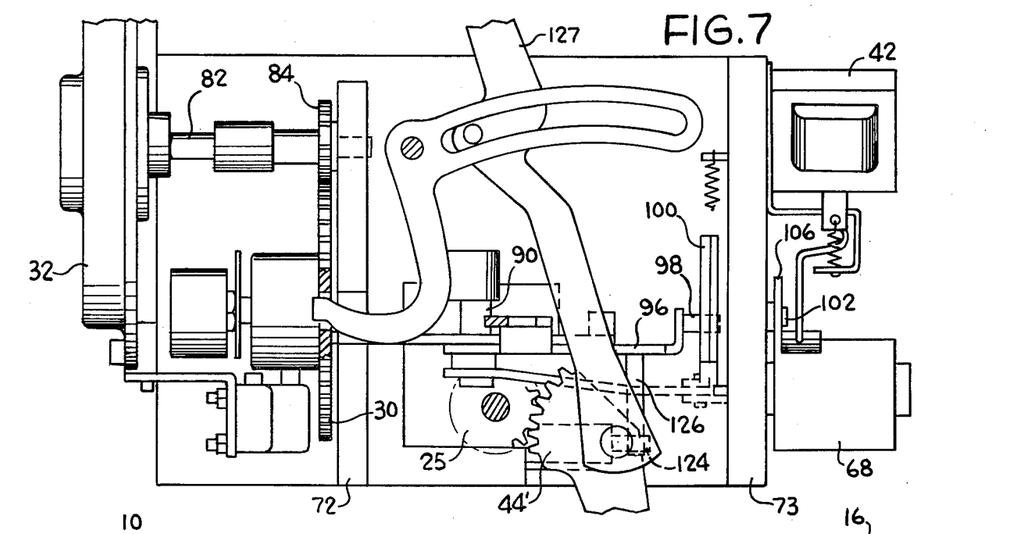
FIG. 7 is a top view, shown partially in cross section, of this portion of the servodrive apparatus taken through plane 7—7 in FIG. 6.
Figure 8:
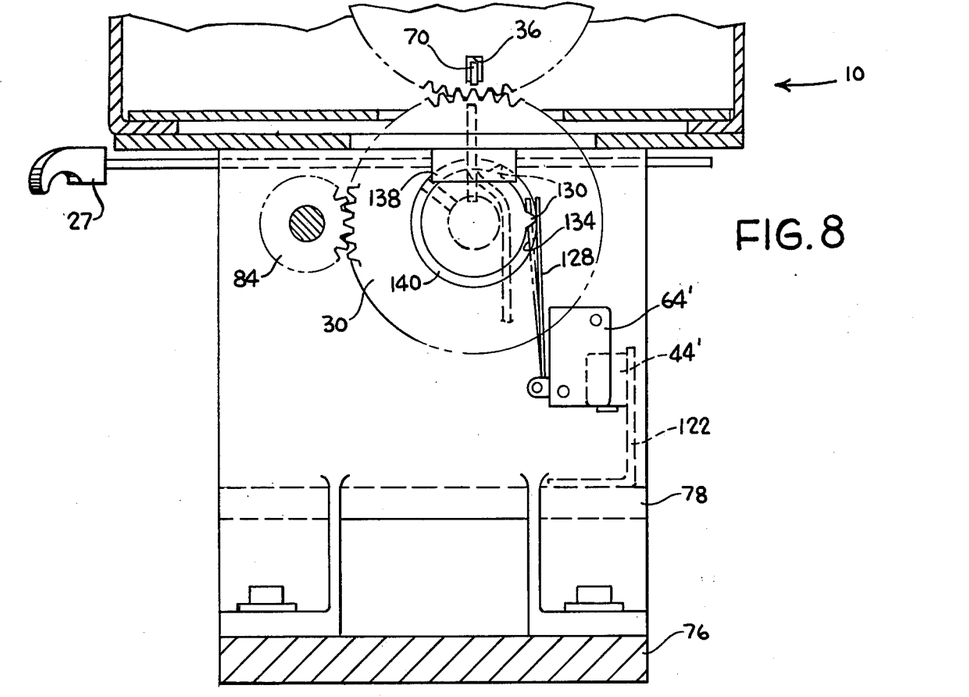
FIG. 8 is a rear view of this portion of the servodrive apparatus, shown partly in cross section, taken through plane 8—8 in FIG. 6 looking toward the right.
Figure 9:
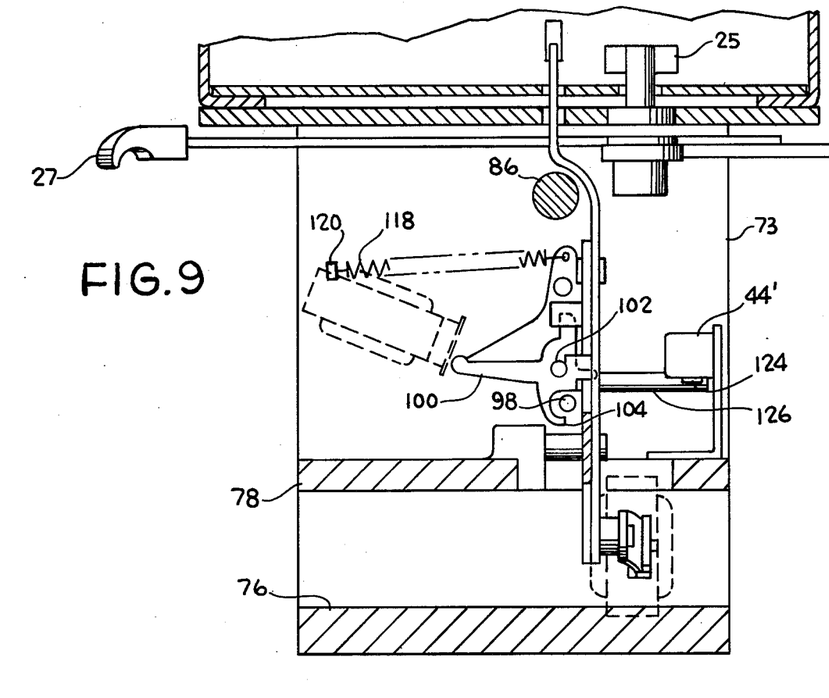
FIG. 9 is a partial cross-sectional view taken through discontinuous 9—9 of FIG. 6 looking toward the right.
Figure 10:
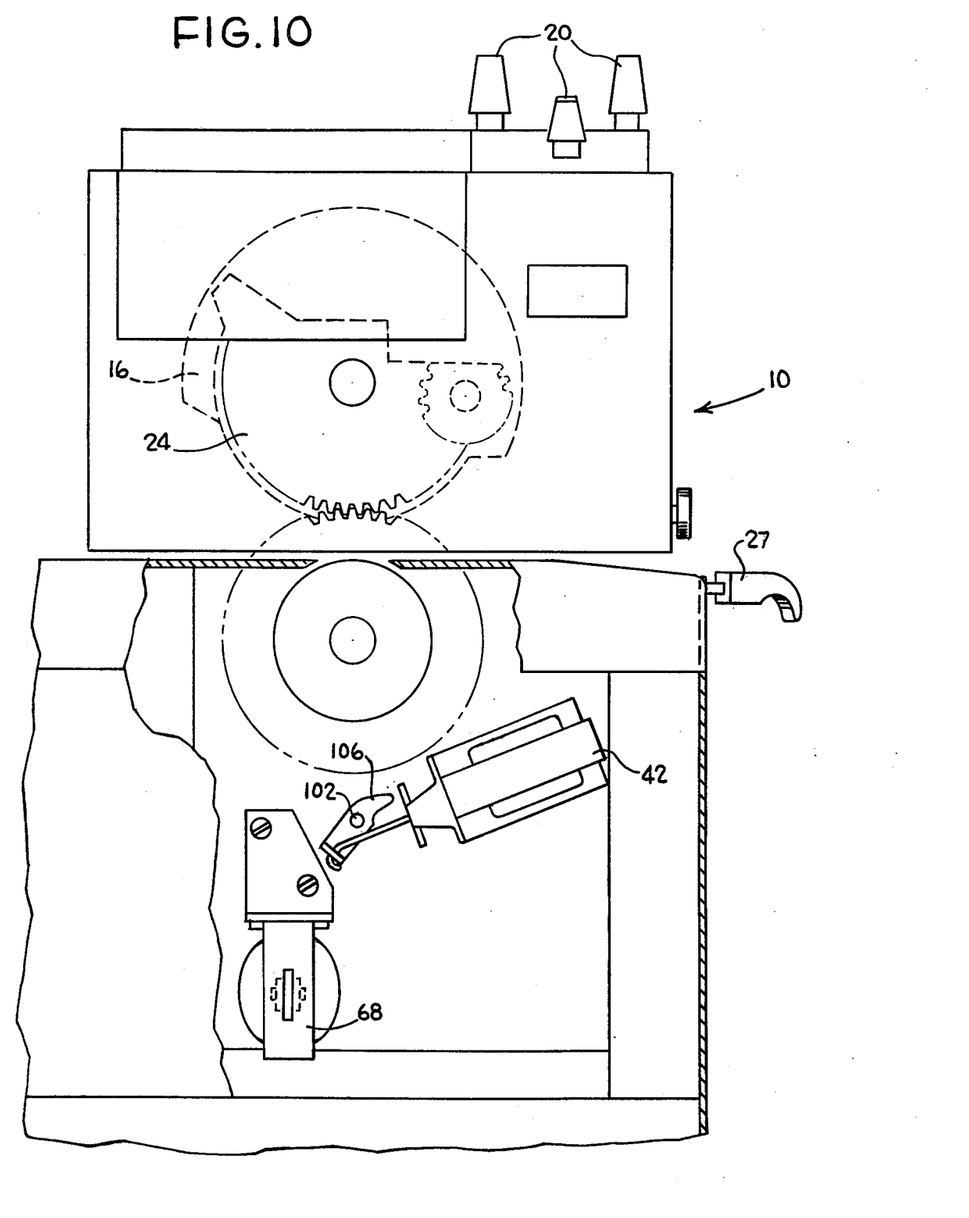
FIG. 10 is an enlarged front view of the postage meter and servodrive apparatus.

Apparatus for actuating the shutter bar 34 is also mounted in the support frame and includes an actuator lever 88 (FIG. 6) mounted for pivoted movement on a pin 90 and having a upwardly projecting finger 92 which engages a notch 94 in shutter bar 34. When actuator lever 88 is pivoted in a clockwise direction, as shown in FIG. 6, the shutter bar is slid rightward to withdraw the locking tab 70 from the locking hole 36. Conversely, when rotated in a counterclockwise direction, actuator lever 88 moves the shutter bar 34 leftward into locking engagement with the locking hole 36.

The actuator lever 88 also is formed with a forwardly projecting arm 96 which carries a forwardly projecting latch pin 98. A rotatable latching member 100 (FIG. 9) pivots about a shaft 102 mounted in the front end plate 73 and includes a C-shaped hook 104 which engages latch pin 98. A crank 106 (FIG. 10) is mounted for rotation on the opposite end of the pivot shaft 102 and is connected to a solenoid that is the shutter release actuator 42. When energized, actuator or solenoid 42 rotates latching member 100 so that hook 104 disengages from latch pin 98.

A spring 108 (FIG. 6) is stretched between a rearwardly projection arm 110 of the actuator lever 88 and a mounting bracket 112 on the rear end wall 72 to rotate the actuator lever in a clockwise direction when unlatched.

The actuator lever 88 also has a downwardly projecting arm 114 which is connected by a link 116 to a solenoid which forms the shutter bar reset actuator 68. When energized, the reset actuator solenoid pivots actuator lever 88 in a counterclockwise direction, moving latch pin 98 upward and permitting latching member 100 to reengage it under the influence of a spring 118 (FIG. 9) stretched between latching member 100 and a mounting tab 120.

Shutter bar release sensor 44 may be a microswitch 44' as shown in FIG. 6, mounted on an upright bracket 122 carried by the mounting table 78. Microswitch 44' has a switch lever 124 which engages a cantilevered pin 126 mounted on the forwardly projecting lever arm 96. Accordingly, when cantilevered pin 126 moves downward, microswitch 44' closes to generate a cycle start signal that in turn, is conducted to a motor control 48 to start the drum motor 32.

As shown in FIG. 6, end run sensor 60 may be a microswitch 60' mounted on a transverse bracket 127 and having a switch lever 128 positioned to engage a cam lobe 130 on drive shaft 86. Cam lobe 130 is positioned to close microswitch 60' when the high constant angular velocity printing drum rotation is completed.

In addition, also as shown in FIG. 6, home position sensor 64 may be a microswitch 64' mounted on transverse bracket 127 and having a switch lever 134 positioned to engage a second cam lobe 136 on drive shaft 86. Cam lobe 136 is positioned to close microswitch 64' when the drum 16 returns to its home position.

These microswitches which detect various occurrences in the printing cycle may be replaced by any other suitable switching means. For example, photosensitive transistors such as that shown at 138 (FIG. 8) may be used in conjunction with a slotted disc 140 to generate signals comparable to those generated by the microswitches.

Potentiometer 50 is mounted on the support plate 80 and has its slider shaft 141 coupled to main drive shaft 86. Since main drive shaft 86 rotates at an angular velocity identical to that of drum 16, the angular displacement of the drum is proportional to the voltage on slider 56.

Figures 4, 11:
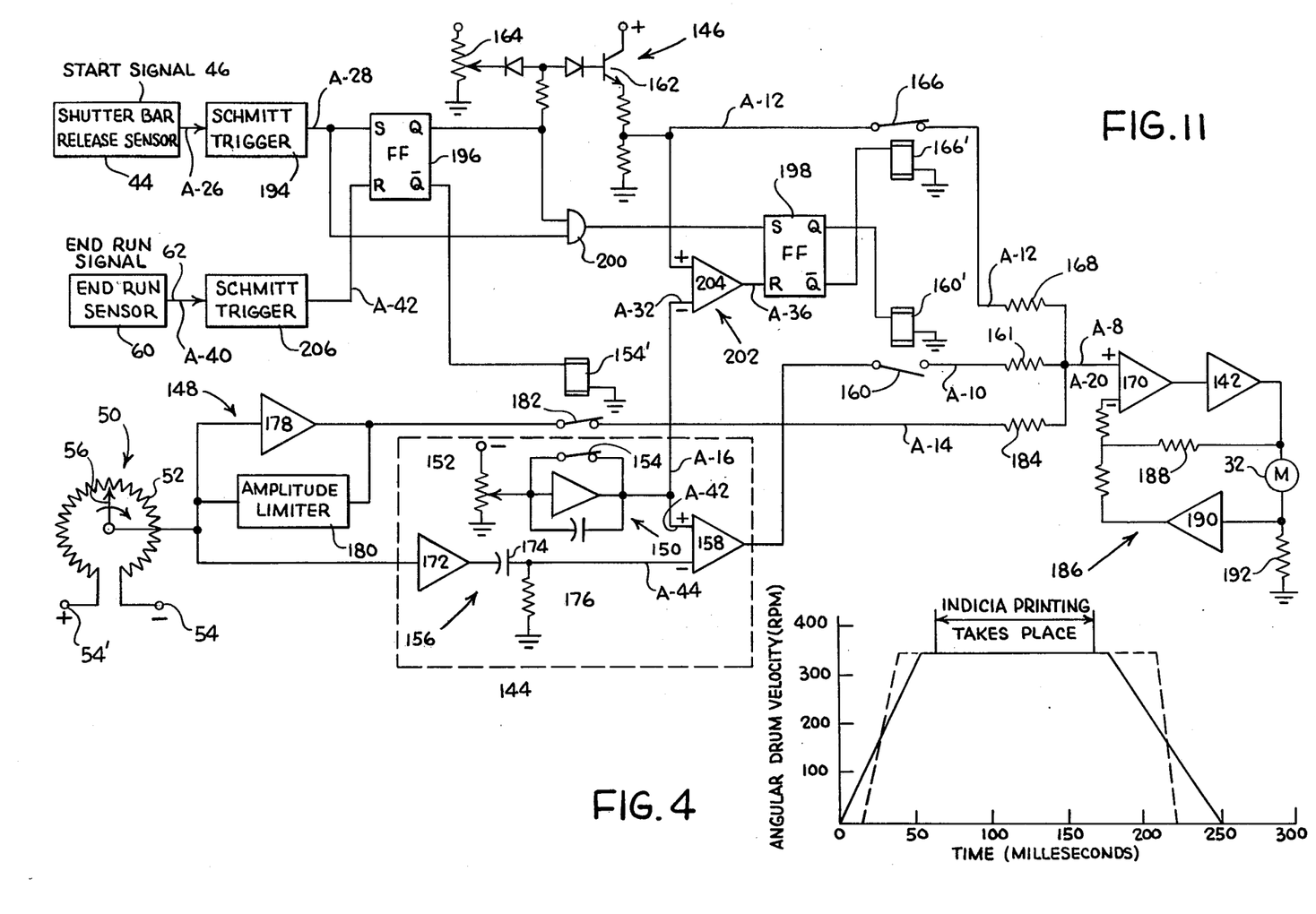
FIG. 4 is a graph of the angular drum velocity of both a typical postage meter and a servodrive postage meter in revolutions per minute, as a function of time, in milliseconds.
FIG. 11 is a schematic block diagram of an electrical circuit of the servodrive apparatus of the present invention suitable for controlling the motor to drive the posage meter printing drum at a preselected angular velocity.

An electrical motor control circuit 48' is illustrated in schematic block diagram form in FIG. 11. The control circuit is shown provided with a plurality of switches shown in their position prior to the start of a printing cycle by drum 16. The motor 32 is driven by a power amplifier 142 which amplifies an input control signal on line A8 from the remainder of the motor control circuit 48' to regulate the angular motor velocity.

The motor control circuit 48' includes three stages 144, 146, 148 for generating respectively signals on lines A10, A12, A14 to control acceleration, constant velocity, and deceleration phases of the motor 32. The first stage 144 generates a ramp signal on line A16 representative of the desired acceleration phase of the motor velocity. Stage 144 includes an integrating operational amplifier 150 provided with an input signal which may be adjusted in amplitude by a potentiometer 152.

Relay controlled switch 154 is connected across amplifier 150 to reset the ramp signal when switch 154 is closed and initiate the ramp signal when switch 154 is opened.

The first stage 144 further includes a velocity signal sensing circuit 156 which is connected to an input A44 of a comparator operational amplifier 158 while the output of ramp generator 150 is applied to input A42. The output of amplifier 158 is an acceleration error signal which is proportional to the difference between the ramp and velocity signals and is connected through relay switch 160 and resistor 161 to the amplifier 170.

The second stage 146 includes a controlled transistor 162 for generating a constant run signal proportional to the constant velocity phase of the preselected angular velocity which is adjusted by a potentiometer 164.

The output of the run or constant velocity control signal generator stage 146 is connected through a relay controlled switch 166 and a resistor 168 to input A8 of a comparator operational amplifier 170.

As noted with reference to FIG. 3, the angular drum displacement sensor is a potentiometer 50 having a fixed resistance 52, connected between negative and positive voltage sources 54—54′, and a continuously rotatable slider 56 coupled to the drum to rotate with it. The potentiometer 50 is oriented so that the voltage on slider 56 is zero when the drum 16 is at its home position.

The slider output of the potentiometer 50 is connected to the velocity sensing circuit 156 which is a differentiating circuit. Circuit 156 includes an operational amplifier 172 whose output is connected through a capacitor 174 to generate an output signal across a resistor 176 representative of the velocity of the rotating printing drum.

The third deceleration control stage 148 is driven by the output of the potentiometer 50 to produce a deceleration control signal on line A14. Stage 148 includes an operational amplifier 178 which produces an output signal whose amplitude is limited by a network 180, such as two series coupled diodes connected across the input and output of amplifier 178.

The deceleration control signal generator 148 is connected through a relay controlled switch 182, and a resistor 184 to input A8 of operational amplifier 170.

The motor control 48′ also includes a local motor feedback control circuit 186 to maintain the speed of the motor 32 under load variations during the constant velocity phase. This local feedback circuit 186 includes a resistor 188 connected to sense the motor driving voltage from power amplifier 142 and an operational amplifier 190 coupled to respond to the voltage developed by a resistor 192 connected in series with motor armature current. The circuit 186 which is a previously known technique may also be such as described in FIG. 2 of the aforementioned PMI application Note AN-4.

The voltage from amplifier 190 and resistor 188 are combined at an input A20 of comparator amplifier 170 whose other input is coupled to line A8. The output of comparator 170 provides power amplifier 142 with a control voltage whose magnitude will cause the motor 32 to rotate the drum 16 at the speeds called for during the various cycle phases independent of motor load variations.

The motor control circuit commences to operate switches 154, 160, 166 and 182 upon actuation of a shutter bar release sensor 44 adapted to generate a start signal 46 on line A26 when the shutter bar release actuator 42 is operated. The signal from sensor 44 is coupled to generate a pulse on line A28 from a schmitt trigger circuit 194. Line A28 is coupled to set a main control flip flop 196, and a second flip flop 198 through an AND gate 200. Second flip flop 198 controls solenoids 160′ and 166′ which operate switches 160 and 166 respectively. The solenoids 160′ and 166′ are connected from opposite outputs of flip flop 198 to thus close switch 160 and open switch 166 with flip flop 198 in the reset state and vice versa for switches 160, 166 with flip flop 198 in the set state.

The $\overline{Q}$ output of flip flop 196 is coupled to operate a solenoid 154′ which controls switches 154 and 182.

The ramp signal on line A16 and run signal on line A12 are respectively connected to inputs A32, A34 of an acceleration cut out network 202 in the form of an operational comparator amplifier 204. The amplifier 204 produces an output signal on line A36 to reset flip flop 198 when the ramp signal on line A16 exceeds the run signal on line A12.

Still referring to FIG. 11, the end run sensor 60 generates an end run signal to indicate the end of the constant velocity phase of the rotating printing drum cycle. The end run signal on line A40 is connected to a schmitt trigger 206 whose output A42 is applied to reset flip flop 196. When flip flop 196 is reset solenoid 154′ is energized to close switches 154 and 182.

The motor control circuit 48′ functions as follows. At the home position of drum 16, switches 154, 166 and 182 are closed and switch 160 is open as illustrated in FIG. 11. At this time, the outputs A10, A12, A14 of the acceleration, run, and deceleration control signal generators are zero and, the motor 32 is not rotated by power amplifier 142.

When the shutter bar 34 is tripped by a piece of mail approaching the printing drum, sensor 44 actuates schmitt trigger 194. This in turn produces a start pulse of approximately 5 milliseconds in duration to set flip flop 196 and deenergize solenoid 154′. At the same time AND gate 200 is enabled to deliver a start pulse to set flip flop 198 and thus deenergize relay 166′ and energize relay 160′. Thus, switch 166 is opened and switch 160 is closed to enable an acceleration control signal on line A10 to drive motor 44.

When switch 154 opens, the ramp generator 150 begins to generate a ramp signal. Opening of switch 182 prevents the deceleration control signal generator 178 from delivering a signal to compartor amplifier 170.

Setting of flip flop 196 also enables transistor 162 to generate a run signal, which, however, is prevented from reaching amplifier 170 by the opening of switch 166.

At this time, comparator amplifier 158 in the acceleration control network 144 sees a rising ramp voltage at its positive input A42 and zero voltage at its other or negative input A44 since the drum 16 has not yet begun to rotate. The output of amplifier 158 being applied by comparator amplifier 170 to drive the power amplifier 142 causes motor 32 to start to rotate.

Since the ramp signal exceeds the velocity signal on line A44, the motor 32 will accelerate the drum too rapidly. However, as the drum is accelerated, the differentiated displacement or velocity signal on line A44 increases, causing the output of comparator amplifier 158 to decrease. Hence, as the velocity signal on line A44 approaches the ramp signal on line A42 the motor driving voltage is decreased and in fact if the velocity signal exceeds the ramp signal the motor driving voltage is decreased to reduce the angular motor velocity. In this manner, the drum is driven substantially according to the acceleration schedule set by the ramp signal on line A42.

When the ramp signal on line A16 exceeds the run signal on input A34, the acceleration cut out network 202 resets flip flop 198 to energize solenoid 166′ and deenergize solenoid 160′, thus closing switch 166 and opening switch 160. Accordingly, the run signal is now connected to and the ramp signal is disconnected from comparator amplifier 170. The run signal generator 146 generates a constant signal proportional to the constant velocity phase of the preselected velocity function. Motor feedback circuit 186 is also connected to amplifier 170. This amplifier then produces a driving signal during the constant velocity phase proportional to the difference between the run and feedback signals to regulate angular motor velocity.

After the individual piece of mail has been printed with postage during the constant velocity phase, the end run sensor 60 generates a pulse signal of approximately 3 milliseconds in duration on line A40. This pulse signal causes a reset of flip flop 196 to turn off transistor 162. The run signal on line A12 thus goes to zero. Simultaneously, flip flop 196 energizes solenoid 154' to close switches 154 and 182. Closed switch 154 resets the ramp signal generator and switch 182 connects the deceleration control signal generator 148 to comparator amplifier 170.

The deceleration control signal generator 148 functions with motor feedback circuit 186 as an electronic printing drum detenting system which operates as follows. As noted above, the deceleration control signal is driven with a signal from potentiometer 50 which is set to generate a signal equal to zero with the drum at its home position. During the decreasing velocity or deceleration phase of the motor 32, the potentiometer generates a positive going negative signal. Amplifier polarities are chosen so that at the end run signal 62, the positive input A8 of comparator amplifier 170 sees a voltage, inverted by amplifier 178, as a decreasing positive voltage averaged with zero voltage from transistor 162. Simultaneously, the negative input A20 of the comparator amplifier 170 sees a high positive voltage from the motor feedback circuit 186. Accordingly, the output of comparator amplifier 170 is negative and causes motor 32 to develop a torque opposing rotation of the printing drum. However, as the deceleration control signal decreases, the detenting action also decreases. Accordingly, the deceleration control and motor feedback circuit signals eventually are balanced through amplifier 170 to detent the motor at the home position. That is, the potentiometer output signal and, hence, the deceleration control signal goes to zero, the motor feedback signal goes to zero, and the motor stops rotating at the home position. In this fashion, the drum is driven from its high constant velocity to home position in the desired period of time because of the orientation of the potentiometer 50 and the timing of the end run signal.

In the event the drum overshoots or undershoots its home position, the potentiometer 50 generates a detenting control signal whose polarity is such as to cause the motor 32 to rotate to its home position.

To insure that the electronic detenting function is accomplished properly, the deceleration signal is limited in amplitude by network 180 such as a pair of diodes connected across the input and output of amplifier 178. This prevents the drum 16 from being detented too early during deceleration.

When the drum is returned to its home position, the home position sensor 64 operates a shutter bar reset signal which actuates the shutter bar reset actuator 68. This action completes the printing drum printing cycle.

As noted above, sensors other than microswitches or phototransistors may be employed in the servodrive apparatus of the present invention. Similarly, other motors than the printed circuit motor which are capable of controlled, high angular acceleration and deceleration and which develop high torque may also be used.

Although a specific embodiment of the present invention has been disclosed in detail above, it is to be understood that this is for purposes of illustration. This disclosure should not be construed as limiting the scope of the invention since changes can be made to the described servodrive apparatus for a postage meter by those skilled in the art in order to adapt it to particular applications.

What is claimed is:

1. In a postage meter having a postage printing drum mounted for rotation from and to a home position in single revolution increments and means for transporting individual pieces of mail, each at substantially the same speed with respect to each other, said pieces of mail being delivered into operative engagement with the incrementally rotating drum to be printed with postage at a fixed location on each of said pieces of mail, a servodrive apparatus for driving the drum and for controlling the angular velocity of the drum to be substantially equal to a preset angular velocity, said servodrive apparatus comprising:

drive means for driving the printing drum;
sensing means for sensing the angular displacement of the drum and for producing a signal proportional to the developed angular velocity;
a signal generator for producing a signal proportional to the preset angular velocity;
a comparator for receiving the signals of the signal generator and said sensing means for sensing the angular displacement of the drum and for producing a signal proportional to the developed angular velocity;
a comparator for comparing the sensed angular velocity of the drum and the preset angular velocity; and
control means operatively connected and responsive to said drum substantially at the preset angular velocity.

2. The servodrive apparatus for a postage meter as claimed in claim 1 wherein said sensing means comprises:

a signal generator for producing a displacement signal proportional to the angular displacement of the drum; and
a differentiating circuit connected to said displacement signal generator for producing a velocity signal proportional to the angular velocity of the drum.

3. The servodrive apparatus for a postage meter as claimed in claim 2 wherein said displacement signal generator comprises:

means for generating a voltage;
a potentiometer having a fixed resistance connected across said voltage generating means and a slider coupled to the drum to produce the signal proportional to the angular displacement of the drum.

4. The servodrive apparatus for a postage meter as claimed in claim 1 wherein said preset angular velocity comprises increasing, constant, and decreasing angular velocity phases, wherein said signal generator is connected to said comparator for producing a ramp signal proportional to the increasing velocity phase of the preset angular velocity.

5. The servodrive apparatus for a postage meter as claimed in claim 4 wherein said comparator comprises:

a comparator amplifier to which said ramp signal generator and said sensing means are connected, said comparator amplifier being connected to said control means for producing a driving signal during the increasing velocity phase proportional to the difference between the ramp and velocity signals to regulate said control means.

6. The servodrive apparatus for a postage meter as claimed in claim 1 wherein said preset velocity comprises increasing, constant and decreasing velocity phases and wherein said signal generator is connected to said comparator for producing a run signal proportional to the constant velocity phase of the preset angular velocity.

7. The servodrive apparatus for a postage meter as claimed in claim 6 wherein said sensing means comprises:

a feedback control circuit connected to said drive means for producing a feedback signal proportional to the angular velocity of said drive means and of the drum.

8. The servodrive apparatus for a postage meter as claimed in claim 7 wherein said comparator comprises:

a comparator amplifier to which said run signal generator and feedback control circuit are connected, said comparator amplifier being connected to said control means for producing a driving signal during the constant velocity phase which is proportional to the difference between the run and feedback signals, for the purpose of regulating said control means.

9. The servodrive apparatus for a postage meter as claimed in claim 1 wherein said sensing means comprises:

a signal generator for producing a deceleration control signal proportional to the angular displacement of the drum from the home position;

a feedback control circuit connected to said drive means for producing a feedback signal proportional to the angular velocity of said drive means.

10. The servodrive apparatus for a postage meter as claimed in claim 9 wherein said preset velocity comprises increasing, constant, and decreasing velocity phases, and wherein said comparator comprises:

an amplifier to which said deceleration control signal generator and feedback control circuit are connected, said amplifier being connected to said control means for producing a driving signal responsive to the deceleration control and feedback signals to regulate said control means to electronically detent the drum to the home position substantially at the decreasing velocity phase of the preset velocity.

11. The servodrive apparatus for a postage meter as claimed in claim 10 wherein said deceleration control signal generator comprises:

means for generating a voltage;

a potentiometer having a fixed resistance connected across said voltage generating means and a slider coupled to the drum to produce the signal proportional to the angular displacement of the drum from the home position; and an amplitude limited amplifier for amplifying the output signal of said potentiometer.

12. In a postage meter having a postage printing drum mounted for rotation from and to a home position in single revolution increments, means for transporting individual pieces of mail into operative engagement with the incrementally rotating printing drum to be printed with postage, means for generating a cycle start signal when each piece of mail passes a predetermined point in the transport means, a shutter bar for locking the drum at the home position, a shutter bar actuator responsive to the cycle start signal to unlock the shutter bar to permit rotation of the drum, and a reset actuator for resetting the shutter bar after the mail has been printed with postage; a servodrive apparatus for driving the drum and for controlling the angular velocity of the drum to be substantially equal to a preselected angular velocity, said servodrive apparatus comprising:

drive means for driving the drum;

a switch for starting said drive means when the shutter bar actuator operates to unlock the shutter bar;

sensing means for sensing the angular displacement of the drum and for producing a velocity signal proportional to the developed angular velocity;

signal means for producing a signal proportional to the preselected angular velocity;

comparator means operatively connected to said sensing means and said signal means for generating an error signal proportional to the difference between the developed angular velocity and the preselected angular velocity;

control means operatively connected to said comparator and responsive to the error signal, said control means for controlling said drive means to drive the printing drum substantially at the preselected velocity; and means for sensing when the drum has returned to the home position and for subsequently operating the reset actuator.

13. The servodrive apparatus for a postage meter as claimed in claim 12 wherein said preselected velocity comprises increasing, constant, and decreasing velocity phases, and wherein said signal means for producing a signal proportional to the preselected velocity comprises:

a ramp signal generator connected to said comparator means for producing a ramp signal proportional to the increasing velocity phase;

a run signal generator connected to said comparator means for producing a run signal proportional to the constant velocity phase; and a deceleration control signal generator connected to said comparator means for producing a deceleration control signal proportional to the angular displacement of the drum from the home position.

14. The servodrive apparatus for a postage meter as claimed in claim 13 further comprising:

switching means for selectively, sequentially connecting said ramp, run, and deceleration control signal generators through said comparator means to said control means respectively during the increasing, constant and decreasing velocity phases of the preselected velocity.

15. The servodrive apparatus for a postage meter as claimed in claim 13 wherein said comparator means comprises:

a first comparator amplifier to which said ramp signal generator and angular displacement sensing means are connected; and a second comparator amplifier to which said run and deceleration control signal generators, and first comparator amplifier are connected.

16. The servodrive apparatus for a postage meter as claimed in claim 15 further comprising:

a first switch for selectively connecting said first comparator amplifier to said second comparator amplifier;

a second switch for selectively connecting said run signal generator to said second comparator amplifier; and a third switch for selectively connecting said deceleration control signal generator to said second comparator amplifier.

17. The servodrive apparatus for a postage meter as claimed in claim 16 further comprising:

a servodrive start signal generator coupled to the shutter bar actuator for starting said ramp signal generator to generate a ramp signal, for closing said first switch and for opening said second and third switches when the shutter bar is unlocked.

18. The servodrive apparatus for a postage meter as claimed in claim 16 further comprising:

an acceleration cut-out network coupled to said ramp and run signal generators for closing said second switch and for opening said first and third switches when said ramp signal is greater than said run signal.

19. The servodrive apparatus for a postage meter as claimed in claim 16 further comprising:

an end run signal genertor operable after the mail has been imprinted with postage and the constant velocity phase has been completed to close said second and third switches and to open said first switch.

* * * * *

UNITED STATES PATENT AND TRADEMARK OFFICE
CERTIFICATE OF CORRECTION

PATENT NO. : 4,016,467
DATED : April 5, 1977
INVENTOR(S) : Richard A. Hallenbeck It is certified that error appears in the above-identified patent and that said Letters Patent are hereby corrected as shown below:

Column 4, line 29, after the word "discontinuous" insert --plane--;
Claim 19, line 3, change "genertor" to --generator--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*